United States Patent [19]

Frost

[11] Patent Number: 4,539,856
[45] Date of Patent: Sep. 10, 1985

[54] TWO-SPEED AUXILIARY TRANSMISSION

[75] Inventor: Barry L. Frost, Arrington, Tenn.

[73] Assignee: Doug Nash Equipment & Engineering, Franklin, Tenn.

[21] Appl. No.: 535,380

[22] Filed: Sep. 23, 1983

[51] Int. Cl.³ .............................................. F16H 3/08
[52] U.S. Cl. ...................................... 74/363; 74/331; 74/369
[58] Field of Search ............... 74/331, 745, 410, 409, 74/363, 369, 375, 392, 397

[56] References Cited

U.S. PATENT DOCUMENTS

| | | | |
|---|---|---|---|
| 1,320,635 | 11/1919 | Moore | 74/370 |
| 1,702,889 | 2/1929 | Baumheckel | 74/333 |
| 1,834,790 | 12/1931 | Loque | 74/375 |
| 1,876,338 | 9/1932 | Norton | 24/389 |
| 1,981,236 | 11/1934 | Logue | 74/375 |
| 2,091,637 | 8/1937 | Hoffman et al. | 74/410 |
| 2,231,784 | 2/1939 | Thungen | 74/410 X |
| 2,343,733 | 3/1944 | Backus | 74/745 |
| 2,637,221 | 12/1949 | Backus et al. | 74/745 |
| 2,637,222 | 5/1953 | Backus | 74/145 |
| 2,785,582 | 3/1957 | Banker | 74/877 |
| 2,886,982 | 5/1959 | Thomas | 74/745 |
| 3,105,395 | 10/1963 | Perkins | 74/331 X |
| 3,283,613 | 11/1966 | Perkins | 74/745 |
| 3,611,823 | 10/1971 | Richards et al. | 74/331 |
| 3,626,777 | 12/1971 | Longenbeck | 74/331 X |
| 3,648,546 | 3/1972 | McNamara | 74/745 |
| 3,885,446 | 5/1975 | Pengilly | 74/331 |
| 3,910,131 | 10/1975 | Richards | 74/331 |
| 4,019,400 | 4/1977 | Stump | 74/333 |
| 4,173,906 | 11/1979 | Altenbokum et al. | 74/801 X |
| 4,375,172 | 3/1983 | Richards et al. | 74/331 X |

FOREIGN PATENT DOCUMENTS 370688  2/1907  France .................................. 74/331

Primary Examiner—George A. Krizmanich
Assistant Examiner—Dirk Wright
Attorney, Agent, or Firm—Luedeka & Neely

[57] ABSTRACT

An auxiliary transmission unit having multiple countershafts is disclosed for use in a motor vehicle. The countershafts are disposed about an input sun gear and an output sun gear in such a manner as to provide an opening for a shift fork to reach a central shift mechanism locating the planet gears, one with respect to the other, at angular alignment positions in an unequally spaced manner. A tooth of one sun gear at an alignment position will be aligned with a tooth of the other sun gear at least once during one revolution of a countershaft. The unequal spacing of the countershafts provides reduced height for the auxiliary transmission housing.

9 Claims, 4 Drawing Figures

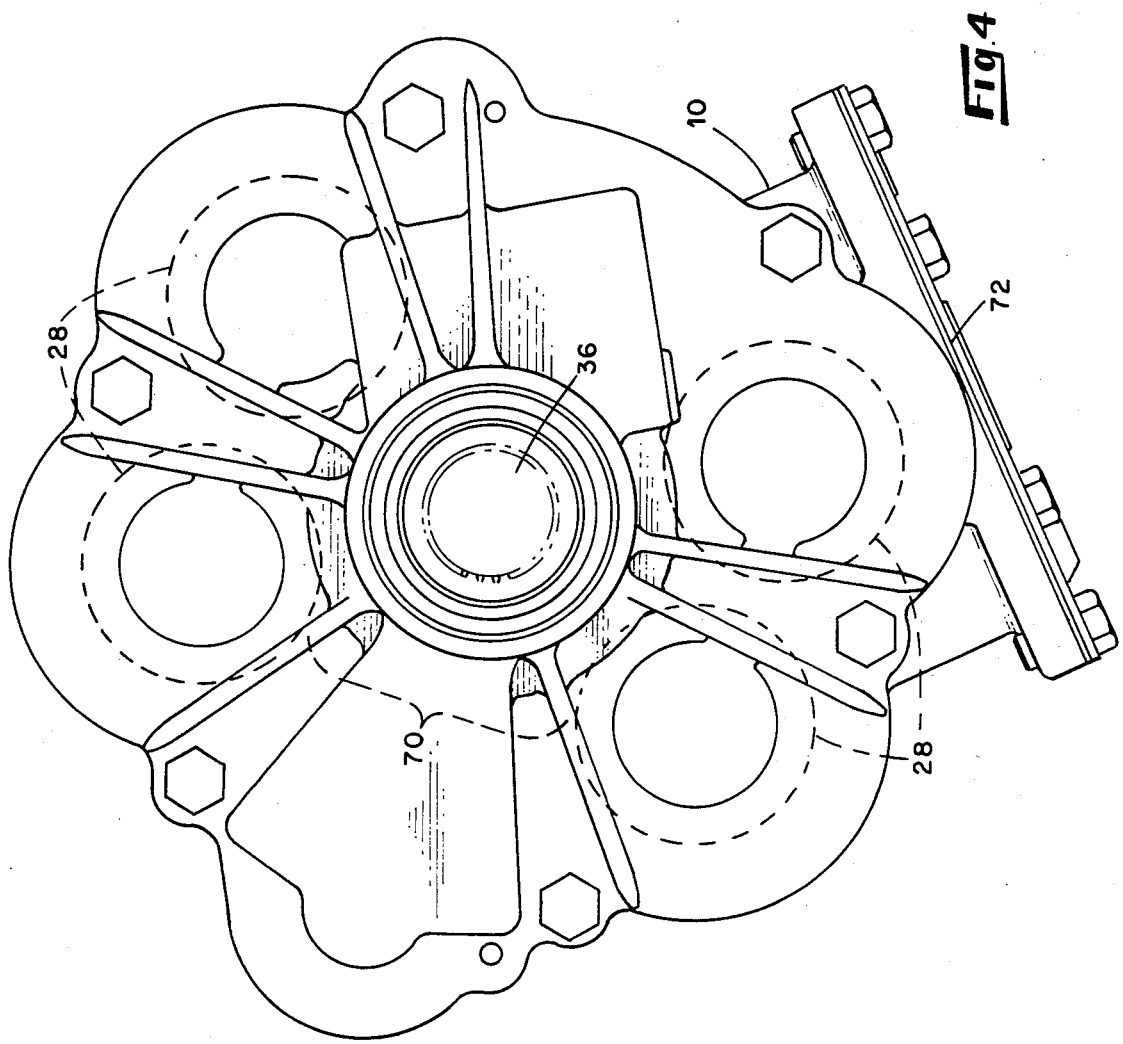

TWO-SPEED AUXILIARY TRANSMISSION

FIELD OF THE INVENTION

The present invention relates generally to the field of auxiliary power transmissions, and more particularly concerns a two-speed auxiliary power transmission having multiple countershafts.

BACKGROUND AND SUMMARY OF THE INVENTION

In a vehicle transmission, it is often desirable to have an auxiliary transmission interposed between the primary transmission and the drive shaft of the vehicle. Such auxiliary transmission will normally provide two gear ranges for the vehicle. For example, in a small truck, it may be desirable to provide a higher than normal drive gear range to maximize gas mileage for highway driving. In a jeep or the like, a lower than normal drive gear range may be convenient for off-road operation.

An important design criteria for such auxiliary transmission is size. The transmission must be small so that it will fit in the vehicle in addition to the principal transmission and will not add excessive weight to the vehicle or unduly reduce other compartment sizes in the vehicle. In many cases, the verticle dimension or height of the auxiliary transmission is one critical size dimension because this dimension is limited below by the required ground clearance and above by limitations on intruding into the engine, primary transmission, and passenger space.

In the present invention, the size and weight criteria for an auxiliary transmission are met by the provision of a transmission having multiple countershafts. In accordance with one form of the invention, an auxiliary power transmission has first and second power shafts with first and second sun gears for being rotatably interconnected with the power shafts. The first and second sun gears have differing diameters, and a shift mechanism mechanically interconnects the first and second power shafts and shifts between engagement with the first sun gear and the second sun gear. A transmission housing is dimensioned to house and support the auxiliary power transmission, and first and second main bearings are provided in the housing for rotatably supporting the first and second power shafts, respectively. There are at least three first planet gears disposed about and continuously intermeshed with the first sun gears, and three second planet gears are disposed about and continuously intermeshed with the second sun gear. Three countershafts are provided with each shaft carrying one of the first planet gears on one of its ends and carrying one of the second planet gears on the other of its ends so that each of the three countershafts and the carried first and second planet gears form at least three planet gears sets that transmit power between the first and second sun gears. A plurality of countershaft bearings in the housing rotatably support the countershafts and the planet gear sets are positioned to entrap and at least partially support the first and second sun gears so that the countershaft bearings help support the first and second power shafts. The first and second main bearings are dimensioned according to the support of the first and second power shafts provided by the countershaft bearings. The planet gears sets are unequally spaced apart, one from the other, about the first and second sun gears to form at least one space between the planet gear sets that is large relative to at least one of the other spaces between the planet gear sets.

The large spacing between the planet gear sets provides a good access to the interior of the auxiliary transmission. In most cases, a shift mechanism will be located within the planet gear sets, and the large spacing will allow a shift fork to have easy access to the shift mechanism. Thus, the unequal spacing of the planet gear sets facilitates the shifting of the transmission.

Also, since the planet gear sets are unequally spaced, the housing may also be constructed with one or more flat sides which occurs at the larger spacing between the planet gear sets. One transverse dimension of the auxiliary transmission is, thus, reduced and the transmission may be mounted so that this reduced dimension is oriented to provide a minimized height for the auxiliary transmission. Since the height of the auxiliary transmission is often a critical dimension for such transmissions, the unequal spacing of the planet gear sets on the present invention provides a structure particularly suited for this type of transmission.

An additional advantage to unequal spacing is the total number of available gear ratios when not restricted to the conventional requirements for assembly of equally spaced planets, i.e., this non-conventional establishment of angular position of planets allows the use of any tooth combination of suns and planets and therefore just as many overall ratios to select from.

As used herein, the terms sun gear and planet gear are used in a broad descriptive sense to mean that the planet gears are positioned around the sun gears. By use of the term planet gear, it is not intended to imply that the planet gears must rotate about the sun gear and it is not meant to imply that the planet gears must be mounted in some type of carrier that could allow rotation of the planet gears about the sun gears. In the embodiment of the invention described herein, the planet gears are part of a countershaft set whose position (axis of rotation) is fixed with respect to the position (axis of rotation) of the sun gears.

In accordance with another aspect of the invention, it is important that the planet gear sets be located at alignment positions relative to the other planet gear sets in order to provide load sharing between countershafts in the auxiliary transmission. An alignment position is an angular position on the input and output sun gears where the teeth of the two sun gears may be aligned. By definition, a tooth of one sun gear at an alignment position will be aligned with a tooth of the other sun gear at least once during each revolution of the planet gears. When teeth are aligned, a plane passing through the center of a tooth and the center of one sun gear will pass through the center of a tooth on the other sun gear.

Also, in order to provide load sharing in the auxiliary transmission of the present invention, it has been found that the planet gear set should be machined from a single piece of stock with the two planet gears of the planet gear set having at least one pair of aligned tooth spaces. That is, at least one tooth space of one planet gear is aligned with a tooth space on the other planet gear in the set. Each aligned tooth space on one planet gear of a planet gear set must be marked as being aligned with a tooth space on the other planet gear and preferably the tooth alignment is held to within a tolerance of 0.0002 inches. In this construction, with the planet gear sets being machined from a single piece of stock and with the planet gear sets being carefully located, relative to one another, at alignment positions, a strong, smooth operating auxiliary transmission is achieved.

BRIEF DESCRIPTION OF THE DRAWINGS

The present invention may be understood by reference to the Detailed Description of a preferred embodiment when considered in conjunction with the Drawings in which:

FIG. 4 is an end view of the transmission unit viewed from the end on which the output power shaft would extend from the unit with the second planet gears and countershafts shown in phantom lines.

DETAILED DESCRIPTION

Figure 1:
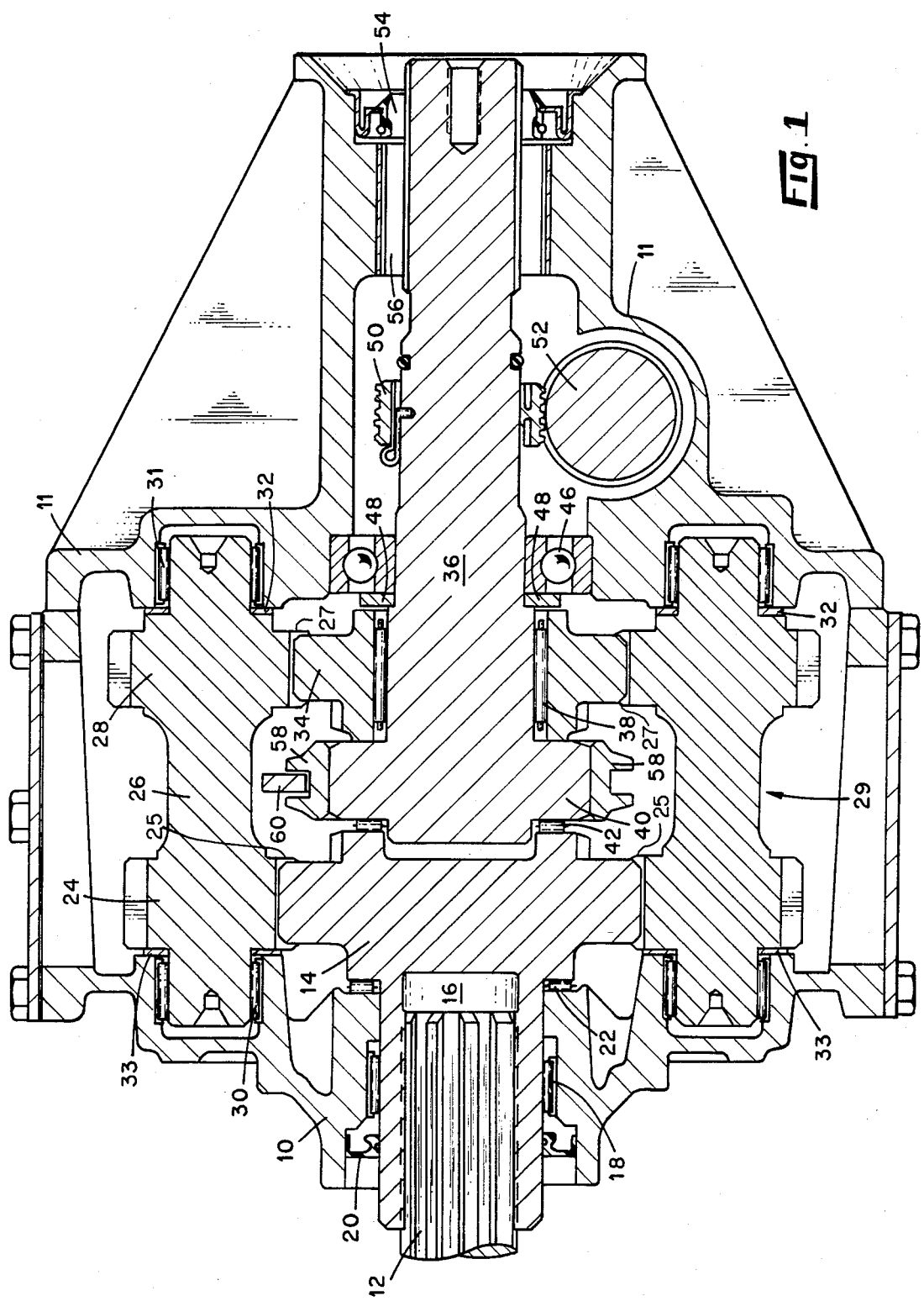
FIG. 1 is a cross-sectional view of a transmission unit showing one form of the present invention.

In the drawings there is illustrated a two-speed auxiliary transmission that is particularly adapted for use as an "overdrive" transmission. However, the principles of the invention may be applied to any other transmission which includes meshing gears, one of which is selectively engaged in the drive train.

Referring now to the drawings in which like reference characters designate like or corresponding parts throughout the several views, as is shown by the cross-sectional view in FIG. 1, the transmission includes a housing 10 and tail housing 11 which is adapted to support the transmission mechanism. The transmission mechanism illustrated is connected to the primary transmission of the vehicle (not shown), by means of an input power shaft 12 on which is mounted an input sun gear 14. A splined socket 16 receives the input power shaft 12 and assists in further interlocking the input power shaft 12 with the input sun gear 14. As an interlocked unit, the input sun gear 14 and the input power shaft 12 are supported for rotation in a bearing 18 which is mounted on the housing 10, and a first seal 20, for preventing the loss of lubricating fluids and for preventing debris from collecting inside the transmission unit, is mounted on the housing 10 between the input sun gear 14 and the housing 10.

The input sun gear 14 is in continuous mesh with a plurality of substantially coplanar first planet gears 24, each of which is located near the end of a countershaft 26. Near the opposite end of each countershaft 26, a second planet gear 28 is located, and together with the first planet gear 24 and the countershaft 26, makes up a planet gear set 29. Each planet gear set 29 is machined from one piece of stock, and whenever the input sun gear 14 turns the first planet gears 24, the second planet gears 28 are also turned. The planet gear sets 29 are supported for rotation in roller bearings 30 and 31 and by thrust bearings 32 and 33. In this manner, the planet gear sets 29 transmit power from the input sun gear 14 to the output sun gear 34.

Each planet gear set 29 is constructed with at least one tooth space 25 of the first planet gear 24 in alignment with at least one tooth space 27 of the second planet gear 28 so that a plane defined by the center axis of the countershaft 26 and the tooth space 25 will pass through the tooth space 27 in the same manner and position as with tooth space 25.

The output sun gear 34 is mounted for selectively free rotation on the output power shaft 36 by means of roller bearings 38, and an output drive spline 40, which is fixedly mounted on the end of the output power shaft 36, is disposed between the output sun gear 34 and the input sun gear 14. A shift collar 58 is meshed with the output drive spline 40 and is operable to slide on the drive spline to place the transmission in neutral, direct drive or overdrive. When not engaged with the output drive spline 40, the output sun gear 34 spins freely on the output power shaft 36, but when the shift collar 58 engages the output drive spline 40 with the output sun gear 34, they turn as an interlocked unit with the rotation of the output power shaft 36 being derived from the planet gear sets 29. So engaged, the transmission is in the "overdrive" position.

Because the shift collar 58 is also capable of sliding coaxially in an opposite direction, it can selectively engage the output drive spline 40 with the input drive gear 14 and cause these two elements to act as an interlocked unit. When in this position, the output power shaft 36 is rotatably driven directly by the input power shaft 12, and the transmission is said to be in "direct drive". A third position, referred to as "neutral" is obtained when the shift collar 58 is substantially coplanar with the output drive gear 40 with neither of the sun gears 14 and 34 being engaged.

The position of the shift collar 58 is selectively determined by manipulation of the shift control arm 62 (shown in FIG. 2) which is mounted on the housings 10 and 10A and connected to the shift linkage of the vehicle (not shown). A shift fork 60 (partially shown in FIG. 1 and best shown in FIG. 2) extends between the countershafts 26 and connects the shift collar 58 with the shift control arm 62. It can be appreciated that the placement of the planet gear sets 29 about the central drive train provides a space sufficient for a shift fork 60 of adequate size to reach between the counter shafts 26 to the shift collar 58.

The output power shaft 36 is supported for rotation in a ball bearing 46 which is mounted on the housing 10 and by a bushing 56, also mounted on the housing 10. Thrust bearings 42 disposed between the output shaft 36 and the input sun gear 14 facilitate rotation, and seals 20 and 54 help prevent the loss of lubricants. A speedometer gear 50 is mounted on and rotates with the output power shaft 36 and is in continuous mesh with a take-off gear 52 for the purpose of monitoring vehicle speed.

In the preferred embodiment, the transmission includes four countershafts 26 arranged about the two sun gears 14 and 34 with an angular spacing of less than 180° degrees between any two adjacent countershafts 26. In this construction the input planet gears 24 trap and partially support the input sun gear 14, and the output planet gears trap and partially support the output sun gear 34. Hence, the countershaft bearings 30 and 31 at least partially support the input power shaft 12 and the output power shaft 36 through the planet gears 24 and 28 and the sun gears 14 and 34. In view of this support, the size of the bearings 18, 46 and bushing 56 supporting the power shafts 12 and 36 may be reduced in size accordingly. That is, the bearings 18 and 46 may be sized to be smaller than the bearing size that would be required under normal design conditions in a transmission where the sun gears 14 and 34 were not trapped and supported. In the specific embodiment disclosed herein the bearings 18 and 46 carry no perceptable radial load and bearings 22, 42 and 46 accept a thrust load only if helical gears are used. However, it will be understood that in other configurations and modifications of the invention, the bearing size and load distribution between the main bearings 18 and 46 and the countershaft bearings 30 and 31 will change. Also safety factors of design will change with varying applications for the transmission which will change the permissible amount of size reduction at bearings 18 and 46.

In operation, the primary transmission of the vehicle (not shown) drives the input power shaft 12 and input sun gear 14 which continuously turn the planet gear sets 29. When the shift collar 58 is positioned for "overdrive", it interlocks the output sun gear 34 with the output drive spline 40, and the planet gear sets 29 transmit power between the input power shaft 12 and the output power shaft 36. While in overdrive, the planet gear sets 29 share a substantially equal load.

When the shift collar 58 is positioned for "direct drive", the input sun gear 14 and the output drive spline 40 are interlocked and power is transferred from the input power shaft 12 and input sun gear 14 through the shift collar 58 to the output drive spline 40 and output power shaft 36. While in direct drive, the output sun gear 34 spins freely on the output power shaft 36. In "neutral" the output sun gear 34 spins freely on the output power shaft 36, and the input sun gear 14 is also not engaged with the shift collar 58.

Figure 2:
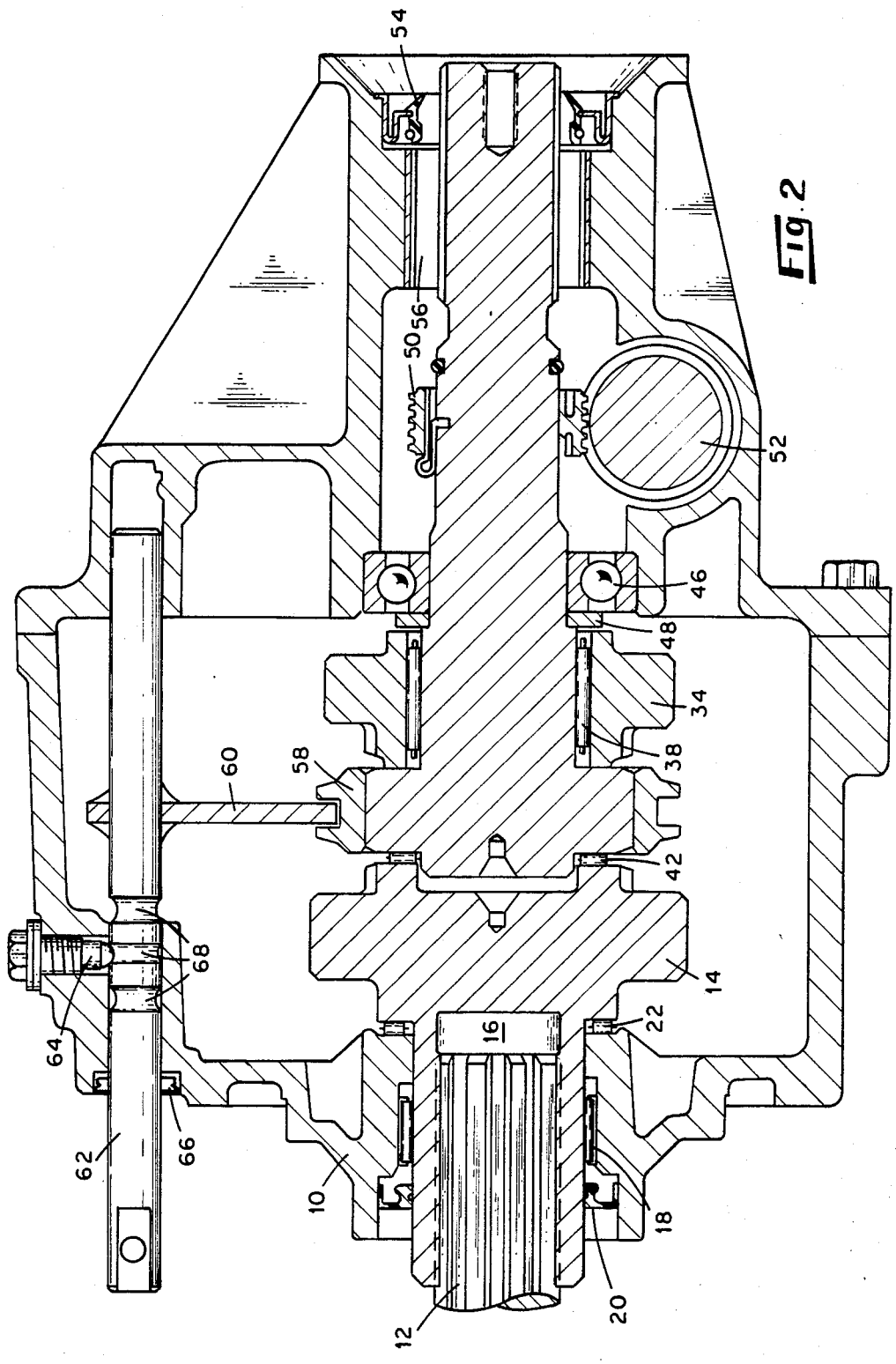
FIG. 2 is a cross-sectional view of the transmission unit depicting the shift collar and shift lever with the planet gear sets removed for purposes of better illustrating the structure of the shift mechanism.

Referring now to FIG. 2 there is shown a cross-sectional view of the transmission unit depicting the shift collar 58 and shift fork 60 with the planet gear sets 29 removed for purposes of better illustrating the structure of the shift mechanism. In the illustrated embodiment, the shift control arm 62 is "notched" by grooves 68 and a tensioned spring detent 64 is mounted on the housing 10 so that the detent 64 holds the shift control arm 62 in place by exerting pressure to it perpendicularly. A seal 66 is mounted on the housing 10 and circumferentially surrounds the control arm 62 to prevent the movement of lubricants and debris while the shift control arm 62 moves from one notched position 68 to another. The shift fork 60, which is fixedly attached to the shift control arm 62, extends between the countershafts 26 and through the large space (see FIGS. 3 and 4) to the shift collar 58 and connects the shift collar 58 to the shift control arm 62. It can be appreciated that the unequal arrangement of the countershafts 26 plays a significant role in providing enough space through which a shift fork 60 with sufficient leverage can pass to manipulate the shift collar 58. In the operation of the embodiment depicted, the position of the shift collar 58 is selected when the vehicle is not in motion because a synchronization mechanism is not used. Of course, this embodiment could be readily modified to use synchronization mechanisms.

Figure 3:
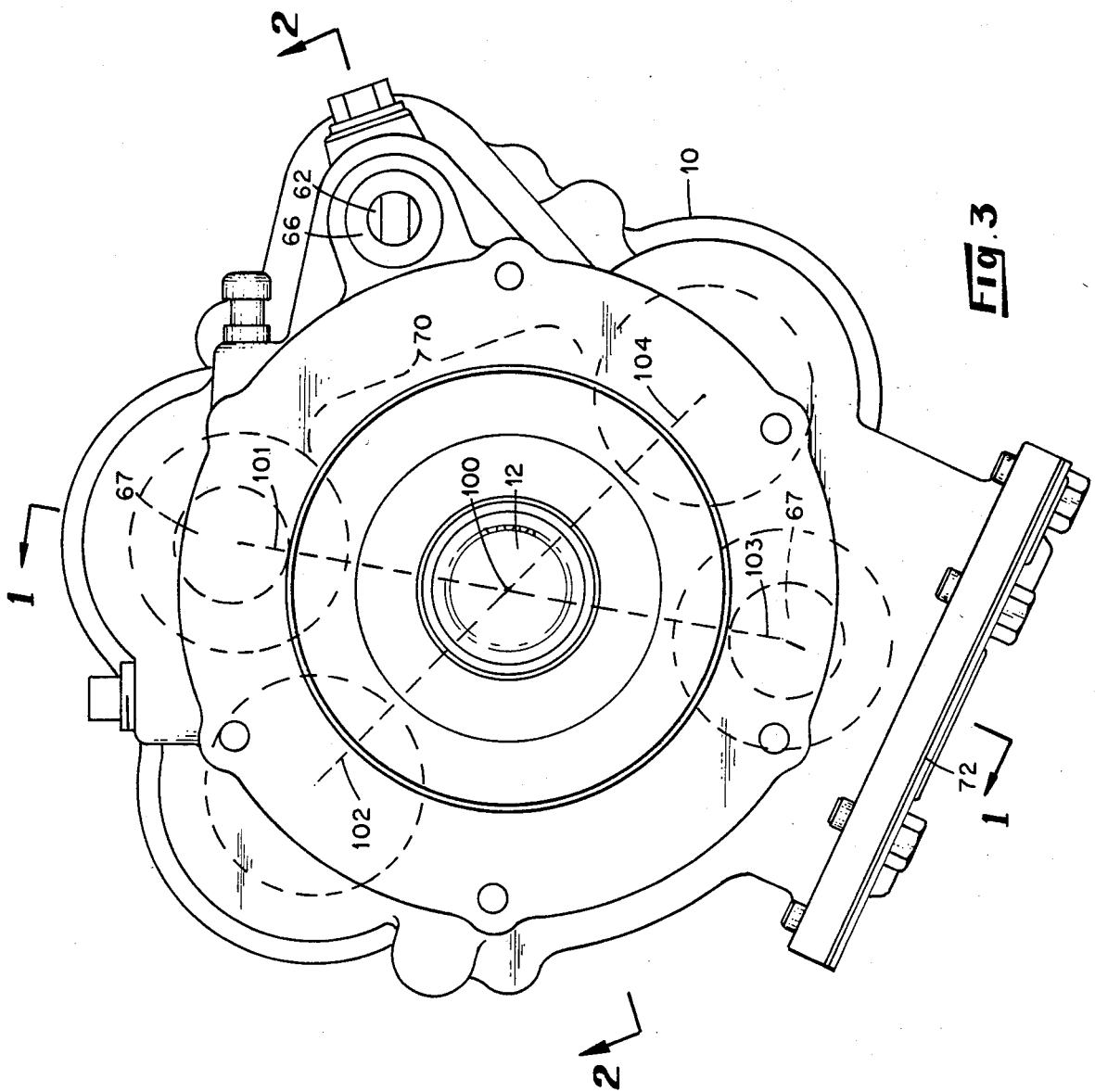
FIG. 3 is an end view of the transmission housing as viewed from the end on which the input power shaft would extend from the unit with the first planet gears shown with phantom lines.

Referring now to FIG. 3, there is shown an end view of the transmission unit as viewed from the end on which the input power shaft 12 would extend. The placement of the first planet gears 24 is depicted by phantom lines, and the large space 70 through which the shift fork 60 extends, is illustrated by an open bracket. Also depicted in FIG. 3 are points determining the cross-sectional lines from which the cross-sectional views in FIGS. 1 and 2 are derived.

The cross-sectional view depicted in FIG. 1 is taken along a line 1—1 (which includes one angle) that extends through the center of two opposing planet gears 24 and then by a line extending from the axis of rotation of the planet gear 24 nearest the bottom of FIG. 3 through the access plate 72 in a substantially perpendicular direction to the plate 72.

The cross-sectional view depicted in FIG. 2 is taken through a line 2—2 which runs through the axis of rotation of the input power shaft 12 and the center of the control arm 62.

In FIG. 4 there is shown an end view of the transmission unit from the end on which the output power shaft 36 would extend. The relative placement of the second planet gears 28 is depicted by phantom lines.

By reference to FIGS. 3 and 4, it can be appreciated that the relative placement of the planet gear sets 29 allows for easy access to the internal shift collar 58 without a substantial increase in the overall size of the transmission unit.

As previously mentioned, the planet gear sets 29 are located about the sun gears at alignment positions. These positions vary depending on the diameter and toothing of the respective gears. In FIGS. 3 and 4, each first planet gear 24 has 17 teeth, an addendum diameter of 2.03 inches, a dedendum diameter of 1.55 inches and a pitch diameter of 1.822 inches. Each second planet gear 28 has 19 teeth, an addendum diameter of 2.30 inches, a dedendum diameter of 1.82 inches and a pitch diameter of 2.080 inches and one tooth space of the first planet gear 24 is aligned with a tooth space of the second planet gear 28. The input sun gear 14 has 39 teeth and a pitch diameter of 4.180 inches, while the output sun gear 34 has 35 teeth and a pitch diameter of 3.832 inches. In this construction, alignment positions occur at angular distances of about 125 degrees and about 55 degrees, amoung others, between the countershafts 29 relative to the center of the input power shaft 12 (or the output power shaft 36).

These alignment positions are best shown in FIG. 3. As illustrated in FIG. 3, starting at the axis of rotation of the power shafts 12 and 36 (designated point 100), four phantom radii 101, 102, 103 and 104 are shown. Each radius passes through the axis of rotation of a planet gear set 29 and the point 100 so that the radii, in this preferred embodiment form two sets of identical angles. The identical angles between radii 101 and 102 and between radii 103 and 104 are larger than the identical angles between radii 101 and 103 and between radii 102 and 104. In this embodiment, the larger identical angles are about 125 degrees, and the smaller identical angles are about 55 degrees. The alignment positions lie along the radii so described.

The assembly of the transmission is accomplished by first aligning two teeth of the two sun gears 14 and 34 at the position of one of the planet gear sets 29. The aligned gear spaces of the planet gear set 29 are then meshed with the aligned sun gear teeth. The sun gears 14 and 34 are then rotated along with the first gear set until the two sun gears have aligned teeth at a position spaced 55° away from the first sun gear set. The aligned tooth spaces of a second gear set 29 are then meshed with the aligned sun gear teeth. The remaining two planet gear sets 29 are mounted in like manner at 125° and 55° spacings. In each instance, the sun and planet gears are rotated until aligned sun gear teeth appear at the positions of the planet gear sets and the marked aligned tooth spaces of the planet gear sets are meshed with the aligned sun gear teeth. It will be understood that the alignment positions will differ for different sun and planet gears, but the alignment positions may be found by mounting one planet gear set, rotating the sun gears and visually finding the alignment positions.

In this construction, it is apparent that the transmission has a long transverse dimension and a short one. Referring to FIGS. 3 and 4, if the shift control arm 62 is designated as the top of the transmission, it will be appreciated that the vertical height of the housing 10 has been reduced relative to the housing that would be required in the case of symetric spacing of the planet gears 24 and 28 about the sun gears 14 and 34. This is an advantageous feature when the transmission of the present invention is used on a vehicle requiring minimized height and weight in an auxiliary transmission.

It will be understood that the above description is a preferred embodiment of the invention and that it is capable of numerous modifications, rearrangements and substitutions of parts without departing from the spirit of the invention. While the gear sizing and the angular spacing of 125 and 55 degrees between the countershafts are considered optimum for most automobile or light vehicle applications, other gear sizing and/or other alignment positions may be chosen without departing from the spirit of the invention.

What is claimed is:

1. An auxiliary power transmission having a first power shaft and a second power shaft, comprising:
    a transmission housing dimensioned to house and support the auxiliary power transmission;
    a first main bearing in said housing for rotatably supporting said first power shaft;
    a second main bearing in said housing for rotatably supporting said second power shaft;
    a first sun gear for being rotatably interconnected with the first power shaft;
    a second sun gear for being rotatably interconnected with the second power shaft, the first and second sun gears having differing diameters;
    a shift mechanism for mechanically interconnecting the first and second power shafts and for shifting between engagement with the first sun gear and the second sun gear;
    said first sun gear having at least three teeth aligned with three teeth, respectively, on said second sun gear;
    said aligned teeth of said first and second sun gears being unequally spaced about said first and second sun gears to form at least one space between said aligned teeth that is large relative to at least one other space between said aligned teeth;
    at least three first planet gears disposed about and continuously intermeshed with the first sun gear;
    at least three second planet gears disposed about and continuously intermeshed with the second sun gear;
    at least three countershafts having two ends, each shaft fixedly carrying one of said first planet gears on one of its ends and fixedly carrying one of said second planet gears on the other of its ends so that said at least three countershafts and said first and second planet gears carried by each of said shafts form at least three planet gear sets that transmit power between the first and second sun gears, each of said planet gear sets having at least one tooth space of said first planet gear aligned with a tooth space of said second planet gear;
    a plurality of countershaft bearings in said housing for rotatably supporting said countershafts; and
    said planet gear sets being positioned about said sun gears so that said aligned tooth spaces of said planet gears receive and engage said aligned teeth of said sun gears, whereby said planet gear sets are unequally spaced apart, one from the other, about the first and second sun gears to form at least one space between said planet gear sets that is large relative to at least one of the other spaces between said planet gear sets.

2. The improvement of claim 1 further comprising a shift lever that extends between the planet gear sets through said large space to the shift mechanism for selectively engaging and disengaging the shift mechanism with one of said first and second sun gears and for disengaging the shift mechanism from the other of said sun gears.

3. The improvement of claim 1 wherein each of said first planet gears, said second planet gears and said countershafts are machined from one piece of stock with the teeth being formed on said first and second planet gears so that at least one tooth space on said first planet gear is angularly aligned with a tooth space on said second planet gear of the same planet gear set.

4. An auxiliary power transmission having an input power shaft and output power shaft comprising:
    a transmission housing dimensioned to house and support the auxiliary power transmission;
    an input main bearing in said housing for rotatably supporting said input power shaft;
    an output main bearing in said housing for rotatably supporting said output power shaft;
    an input sun gear coaxial with the input power shaft for being rotatably interconnected with the input power shaft;
    an output sun gear coaxial with the output power shaft for being rotatably interconnected with the output power shaft, said input and output sun gears having differing diameters;
    said input sun gear having at least four teeth that are aligned with at least four teeth of said output sun gear, said aligned teeth on said input sun gear being positioned about said sun gear such that one angular distance between two aligned teeth is greater than at least one other angular distance between two aligned teeth;
    an output drive spline disposed coaxially on the output drive shaft and between said sun gear;
    a shift collar in continuous mesh with said output drive spline and being slideably mounted on said drive spline for shifting between engagement with said input sun gear and said output sun gear;
    at least four input planet gears disposed about, continuously intermeshed with, and substantially coplanar with said input sun gear;
    at least four output planet gears disposed about, continuously intermeshed with, and substantially coplanar with said output sun gear;
    at least four countershafts having two ends, each shaft fixedly carrying one of said input planet gears adjacent one of its ends and fixedly carrying one of said output planet gears adjacent the other of its ends so that said at least four countershafts and said input and output planet gears carried by said countershafts form at least four planet gear sets that transmit power between said input and output sun gears;

each of said planet gear sets having at least one tooth space of said first planet gear aligned with a tooth space of said second planet gear;

a plurality of countershaft bearings in said housing for rotatably supporting said countershafts;

said planet gear sets being positioned about said sun gears so that said aligned tooth spaces of said planet gears receive and engage said aligned teeth of said sun gears, whereby said at least four planet gears sets are unequally spaced apart, one from the other, about said input and output sun gears so that said planet gear sets form at least one space between them that is large relative to at least one of the other spaces between said planet gear sets;

means for shifting said shift collar between engagement with said input sun gear and said output sun gear;

said planet gear sets being positioned to entrap and at least partially support the input and output sun gears so that the countershaft bearings help support the input and output power shafts; and said input and output main bearings being dimensioned according to the support of the input and output power shafts provided by said countershaft bearings whereby the size and weight of the auxiliary transmission is minimized.

5. The improvement of claim 4 wherein each of said planet gear sets are formed from one piece of stock with teeth being formed on said input and output planet gears so that at least one tooth space on said first planet gear is angularly aligned with a tooth space on said second planet gear of the same planet gear set.

6. The improvement of claim 4 wherein said means for shifting comprise a shift lever that extends between said planet gear sets through said large space to said shift collar for sliding said shift collar to selectively engage said shift collar with one of the sun gears and for disengaging said shift collar from the other of said sun gears.

7. The improvement of claim 4 wherein said output sun gear is rotatably mounted on said output power shaft for selectively free rotation thereon.

8. The improvement of claim 4 further comprising splined teeth formed on the interior of said shift collar dimensioned to intermesh with said output drive spline and said input and output sun gears.

9. The improvement of claim 8 wherein said countershafts are positioned about said input and output power shafts at angular spacing, one from the other, of about 125 degrees and about 55 degrees.

* * * * *